(12) United States Patent
Ferron (10) Patent No.: US 6,280,501 B1
(45) Date of Patent: Aug. 28, 2001

(54) BASE METAL RECOVERY (75) Inventor: Cesar J. Ferron, Peterborough (CA)

(73) Assignee: Lakefield Research Ltd., Ontario (CA)

( * ) Notice: Subject to any disclaimer, the term of this patent is extended or adjusted under 35 U.S.C. 154(b) by 0 days.

(21) Appl. No.: 09/306,311

(22) Filed: May 6, 1999

(51) Int. Cl.$^7$ ....................................................... C22B 3/20
(52) U.S. Cl. ................................ 75/743; 75/744; 423/41; 423/109; 423/150.1
(58) Field of Search ........................ 75/743, 744; 423/41, 423/109, 150.1

(56) References Cited

U.S. PATENT DOCUMENTS

| 2,816,819 | * | 10/1957 | Wallis et al. | 423/142 |
|---|---|---|---|---|
| 3,634,071 | * | 1/1972 | Spedden et al. | 75/730 |
| 3,685,965 | | 8/1972 | Kniprath . | |
| 3,753,691 | * | 8/1973 | Grover et al. | 75/731 |
| 3,894,770 | * | 7/1975 | Huff et al. | 299/5 |
| 4,034,063 | | 7/1977 | Rosar et al. . | |
| 4,067,789 | | 1/1978 | Harris et al. . | |
| 4,290,866 | | 9/1981 | Bolton et al. . | |
| 4,439,288 | | 3/1984 | Hoffmann . | |
| 5,030,279 | * | 7/1991 | Krauth | 75/712 |
| 6,143,259 | | 11/2000 | Arias . | |

FOREIGN PATENT DOCUMENTS

| 935650 | 10/1973 | (CA) . |
|---|---|---|
| 1 165 474 | 4/1984 | (CA) . |
| WO 96/29439 | 9/1996 | (WO) . |
| WO 97/08349 | 3/1997 | (WO) . |

OTHER PUBLICATIONS

2000, No Month, Operation of the Las Cruces Ferric Sulphate Leach Pilot Plant by N. Smalley and G. Davis; Minerals Engineering, vol. 13, No. 6, pp. 599–606.
1999, No Month, Recovery of Copper & Cobalt . . . Republic of Congo (DRC); by G.M. Dunn & C. John; 33 pgs total.
1999, No Month, Separation of Manganese . . . Extraction; by C.Y. Cheng; 10 pgs total.
1999, No Month, The Selection of a Hydroxide . . . Leach Liquors; by Mark Steemson; 23 pgs total.
1998, No Month, Cu/Co Tailings Treatment . . . Republic of Congo; by Dry et al; 32 pgs total.
Jul. 23, 1998, SU 1 411 348 A N Caucasus Mine–Met Database WPI.
1997, No Month, Cobalt Extraction . . . Reagent DS 6001; by M. A. Cox and J. R. Lawson; 18 pgs total.
1996, No Month, Heavy Metals in the . . . Catalysts; by S. J. Clark et al; Hydrometallurgy, vol. 40, pp. 393–394.

(List continued on next page.)

Primary Examiner—Roy King
Assistant Examiner—Tima McGuthry-Banks
(74) Attorney, Agent, or Firm—Thomas A O'Rourke; Wyatt Gerber & O Rourke (57) ABSTRACT A process for recovering a base metal from a material, the base metal being selected from cobalt, copper, nickel and zinc, the process comprising the steps of reacting the host material with a ferric ion species in a leach solution, at conditions sufficient to cause at least a portion of the base metal to be oxidized by the ferric ion species, thereby causing the ferric ion species to be converted to a ferrous ion species, and oxidizing the ferrous ion species with an oxidation mixture of $SO_2$ and oxygen to form the ferric ion species for subsequent reaction with the material.

21 Claims, 6 Drawing Sheets

OTHER PUBLICATIONS

1987, No Month, Processing of Nickel and Cobalt . . . Raw Materials; by Bhaskara Sarma et al; Hydrometallurgy, vol. 19, pp. 83–93.

1984, No Month, The Separation of Manganese from Cobalt by D2EHPA; by Ying–Chu Hoh et al; Hydrometallurgy, vol. 12, pp. 375–386.

1984, No Month, Cobalt Extraction and . . . Precipitation by J. H. Canterford; Hydrometallurgy, vol. 12, pp. 335–354.

Jul. 30, 1982, SU 947 055 A Non Ferr Metal Res Database WPI.

Aug. 15, 1979, SU 679 636 A Tsvetmetavtomatika Database WPI.

Jun. 30, 1977, JP 52 077819 A Toray Ind Inc Database WPI.

Nov. 20, 1973, SU 486 063 A Tsvetmetautomatika Database WPI.

Autoclaving and Barrick Gold, by K.G.Thomas, May 7, 1990. 24 pages total.

Leaching of Metal Sulphide Concentrates at Atmospheric Pressure Using SO2/O2 Mixtures by Adams et al, Dec. 1981. 13 pages total.

Leaching of High–Solids, Attritor–Ground Chalcopyrite Concentrate by In Situ Generated Ferric Sulfate Solution, by Tiwari et al, Mar. 1980. 5 pages total.

* cited by examiner

Chalcocite Enhanced Ferric Leaching

FIG. 4a

SO$_2$/O$_2$ To Reoxidize Ferric During Heap Leach

BASE METAL RECOVERY

BACKGROUND OF THE INVENTION

1. Field of the Invention

The present invention relates to extracting the base metals copper, nickel, cobalt or zinc from materials containing them.

2. Description of the Related Art

Copper sulphide concentrates are typically processed to metal by smelters. Although very efficient, smelters generate substantial quantities of sulphur dioxide gases ($SO_2$) that must be captured to protect the environment. The $SO_2$ captured is normally converted to sulphuric acid. The capture of $SO_2$ and the generation of sulphuric acid significantly increase the costs of smelting copper sulphide concentrates and generates a by-product, sulphuric acid, that has a very weak market because of surplus and transportation costs.

Some gold ores or concentrates containing cyanide-soluble copper minerals cannot be treated economically because of the high operating costs due to the consumption of cyanide by copper.

Various hydro-metallurgical processes have been developed to replace smelters for treating copper sulphide concentrates. Among others, these processes include pressure leaching (either at high, medium or low temperature), ferric ion ($Fe^{3+}$) leaching, and bacterial leaching.

The ability of ferric ion to attack metal sulphides is generally known. In the case of Chalcopyrite ($CuFeS_2$), Coveilite ($Cu_2S$), or Chalcocite ($CuS$) concentrates, the oxidation/leaching reactions with ferric can be written as:

$$CuFeS_2 + 4Fe^{3+} \rightarrow Cu^{2+} + 5Fe^{2+} + 2S^0 \qquad (1)$$

$$Cu_2S + 4Fe^{3+} \rightarrow 2Cu^{2+} + 4Fe^{2+} + S^0 \qquad (2)$$

$$CuS + 2Fe^{3+} \rightarrow Cu^{2+} + 2Fe^{2+} + 2S_0 \qquad (3)$$

The ferric can be added either as ferric chloride or ferric sulphate, although it is known that ferric chloride is kinetically favored over ferric sulphate.

Reactions (1) and (2) indicate that, for example, to dissolve 20 g/L Cu in solution, the leach solution needs at least 70 g/L $Fe^{3+}$ and 17.4 g/L $Fe^{3+}$ for Chalcopyrite and Covellite concentrates respectively. Though useful as a replacement for smelters, ferric ion reaction processes are undesirable, in some cases, because they generate leach solutions containing high levels of dissolved salts and are difficult to process further. Chalcopyrite is known to be a copper mineral which is refractory to chemical dissolution in typical leach conditions, and the reaction (1) indicates that it requires a relatively high dosage of ferric to be dissolved in acid solutions.

One alternative is to regenerate the ferric during the leaching process, that is by oxidizing the ferrous ion to its ferric state. Conventionally either chlorine gas or pure oxygen are used as oxidants in this case, the former in the following reaction:

$$FeCl_2 + \tfrac{1}{2}Cl_2 \rightarrow FeCl_3 \qquad (4)$$

However, chlorine gas is expensive and relatively dangerous to handle and the reaction using pure oxygen gas is too slow to be a feasible oxidant.

Copper heap leaching has become the method of choice, particularly for treating low grade oxidized copper ores, The method is only partially successful in treating copper ores containing secondary copper minerals such as Chalcocite and Covellite, unless the dissolution of these copper minerals is bacterially assisted by organisms such as *Thiobacillus Ferroxidans* and *Thiobacillus Thiooxidans*. The practical application of these bacteria strains is delicate because they require a precise range of temperatures and acidity as well as a range of specific nutrients in order to function properly.

It is an object of the present invention to obviate or mitigate the above mentioned problems.

It is another aspect of the present invention to provide a novel technique for extracting a base metal from a material.

It is still another object of the present invention to provide a novel technique for extracting a base metal from a sulphide material.

It is still another object of the present invention to provide a process by which copper sulphide concentrate can be efficiently leached by ferric sulphate solutions using lower overall ferric ion concentrations than in prior art processes.

SUMMARY OF THE INVENTION

In one of its aspects, the present invention provides a process for recovering a base metal from a material, the base metal being selected from cobalt, copper, nickel and zinc, the process comprising the steps of:

reacting the material with a ferric ion species in a leach solution, at conditions sufficient to cause at least a portion of the base metal to be oxidized by the ferric ion species, thereby causing the ferric ion species to be converted to a ferrous ion species, and oxidizing the ferrous ion species with an oxidation mixture of $SO_2$ and oxygen to form the ferric ion species for subsequent reaction with the material.

In another aspect of the present invention, there is provided a process of treating a material containing a base metal selected from cobalt, copper, nickel and zinc, comprising the steps of:

a) exposing the material to a leach solution including a first ferric ion species therein, at conditions sufficient to liberate at least a portion of the base metal, thereby causing the first ferric ion species to be reduced to a first ferrous ion species, b) reacting the first ferrous ion species with an oxidation mixture of $SO_2$ and oxygen, at conditions sufficient to oxidize the first ferrous ion species to a second ferric ion species;

c) exposing the material to the leach solution including the second ferric ion species at conditions sufficient to liberate a base metal ion, thereby causing the second ferric ion species to be reduced to a second ferrous ion species, and d) repeating step b) for the second ferrous ion species, In another embodiment, the base metal-bearing material is in a heap and wherein steps (a) and (c) include the step of directing the oxidation mixture through the heap. The step of directing may include the step of blowing the sure through pipes located in, or at the bottom of, the heap, although the oxidation mixture may also be directed, as an aqueous mixture, through the heap by percolating the mixture there through, for example.

In another embodiment, the mixture is aqueous and steps (a) and (c) include the step of establishing $SO_2$ in the mixture by sparging $SO_2$ gas there through.

In still another embodiment, the mixture is aqueous and steps (a) and (c) include the step of mixing a metabisulphite therewith.

In still another embodiment, the mixture is aqueous and steps (a) and (c) include the step of establishing $SO_2$ in the mixture by mixing $H_2SO_3$ therewith.

The term 'oxidation mixture' refers to a mixture of sulfur and oxygen, whose proportions are sufficient to cause ferrous ion to be converted to a ferric ion, for example at a range of conditions set out herein below.

Thus, the present invention provides a process by which materials, preferably sulphide materials, containing a base metal can be leached using ferric ion species, requiring relatively smaller quantities of ferric ion species by the use of oxidation mixtures of SO2 and oxygen to regenerate the ferric oxidant. Moreover, this can be achieved either in a one-step process or a two-step process. The two-step process can also be applied for heap or dump leaches. The present invention may also be applied to other materials such as those containing non-sulphide forms of the base metals such as naturally or non-naturally occurring materials containing the base metals in their metallic form.

In still another aspect of the present invention, there is provided a process of treating a base metal bearing host material comprising the steps of:

reacting the metal-bearing host material with a ferric ion species in a leach solution, thereby forming a ferrous ion species and transferring said metal to said leach solution; and oxidizing the ferrous ion species with an oxidation mixture of $SO_2$ and oxygen to form the ferric ion species for subsequent reaction with the metal bearing host material.

In another aspect of the present invention, there is provided a process for treating a metal bearing host material comprising the steps of:

a) exposing the material to a first ferric ion species at conditions sufficient to liberate a metal ion, thereby causing the first ferric ion species to be reduced to a first ferrous ion species;

b) reacting the first ferrous ion species with a mixture of $SO_2$ and oxygen, at conditions sufficient to oxidize the first ferrous ion species to a second ferric ion species;

c) exposing the material to the second ferric ion species at conditions sufficient to liberate a metal ion, thereby causing the first ferric ion species to be reduced to a second ferrous ion species; and d) repeating step b) for the second ferrous ion species.

Preferably, the metal bearing material or metal bearing host material is a sulphide material containing a base metal such as zinc, nickel, cobalt or copper, that is base metals which form, with sulfuric avid, a soluble complex. A base metal excluded from this group is lead which does not form a soluble complex with sulphuric acid, In this case, the material is in the form of for example, a processed ore material or ore concentrate.

BRIEF DESCRIPTION OF THE DRAWINGS

Several preferred embodiments of the present invention will now be described, by way of example only, with reference to the appended drawing in which.

DESCRIPTION OF THE PREFERRED EMBODIMENTS

As will be described herein below, the invention involves, in one of its aspects, a process for recovering a base metal from a material, the base metal being selected from cobalt, copper, nickel and zinc, the process comprising the steps of:

reacting the material with a ferric ion species in a leach solution, at conditions sufficient to cause at least a portion of the base metal to be oxidized by the ferric ion species, thereby causing the ferric ion species to be converted to a ferrous ion species, and oxidizing the ferrous ion species with an oxidation mixture of $SO_2$ and oxygen to form the ferric ion species for subsequent reaction with the material.

This process is beneficial because it enables ferrous species to be oxidized to ferric species in an improved and more economical manner, namely at a greater rate of reaction than other forms, such as by the use of pure oxygen.

Preferably, the process occurs at a pH of between 0.5 and 2.5, more preferably between 1.0 and 2.0, still more preferably 1.5.

Preferably, the oxygen is in the form of $O_2$, preferably as a constituent in Air.

Preferably, the process occurs at a temperature ranging from 10° C. to 90° C., preferably 16° C. to 75° C. In one embodiment, the process is carried out at 20° C.

When the oxygen is supplied as $O_2$ gas, the $SO_2$ may be desirably at a concentration ranging from 0.5% to 10%, with the balance $O_2$ gas. More preferably, the $SO_2$ is at a concentration from 1% to 8%, more preferably, from 2% to 3%

When the oxygen is supplied as a constituent in Air, the $SO_2$ is at a concentration from 00.1% to 2%, with the balance being Air, and more preferably 0.2% to 1.4%, still more preferably from 0.4% to 0.6%.

Thus, in one embodiment, a gas mixture of $SO_2$ and oxygen is used to oxidize the iron into its ferric form, wherein the gas mixture is relatively inexpensive and plentiful oxidant, and which can be a gas mixture of $O_2/SO_2$, or alternatively Air/$SO_2$, or still alternatively 100% pure Air can be used together with equivalent amounts of $SO_2$, preferably added as $SO_2$ in a gaseous or liquid form, or added as a constituent in a solution containing, for example, sodium metabisulphite, ammonium metabisulphite, potassium metabisulphite or other suitable forms of metabisulphite.

In another aspect of the present invention, there is provided a process of treating a material contain a base metal selected from cobalt, copper, nickel and zinc, comprising the steps of:

a) exposing the material to a leach solution including a first ferric ion species therein, at conditions sufficient to liberate at least a portion of the base metal, thereby causing the first ferric ion species to be reduced to a first ferrous ion species;

b) reacting the first ferrous ion species with an oxidation mixture of $SO_2$ and oxygen, at conditions sufficient to oxidize the first ferrous ion species to a second ferric ion species, c) exposing the material to the leach solution including the second ferric ion species at conditions sufficient to liberate a base metal ion, thereby causing the second ferric ion species to be reduced to a second ferrous ion species; and d) repeating step b) for the second ferrous ion species.

Preferably, steps a) to d) occur concurrently in an agitation reactor.

Figure 1:
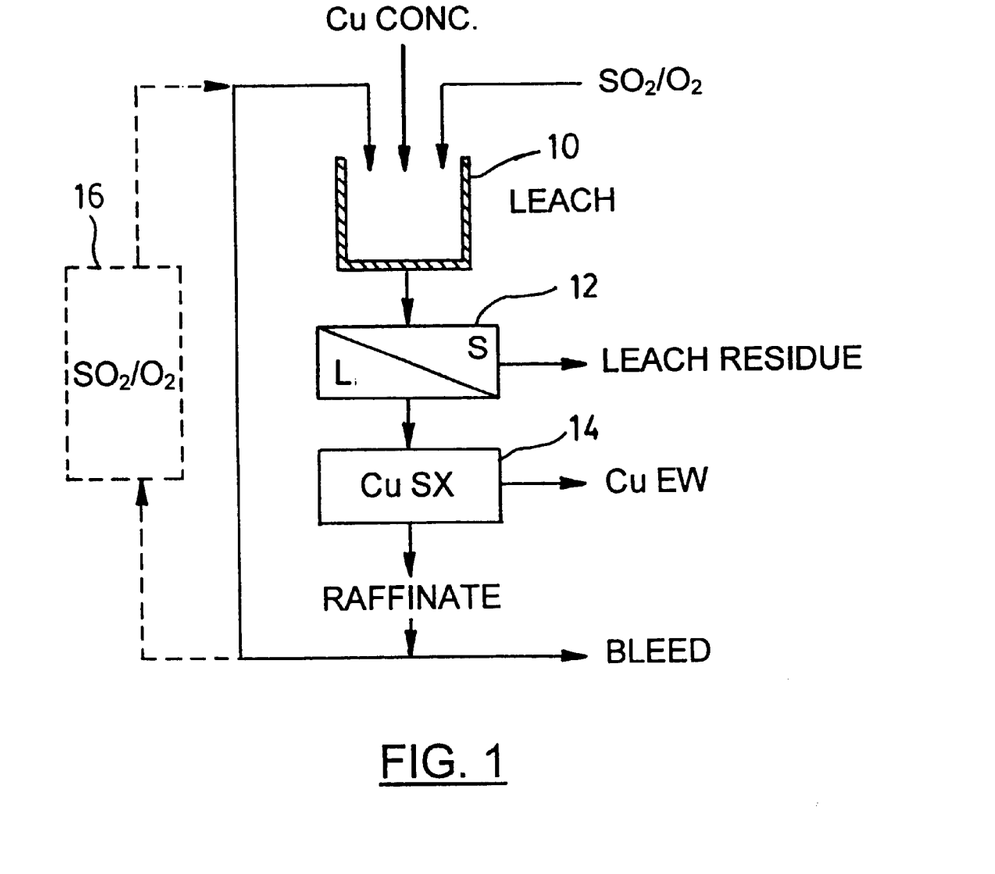
FIG. 1 is a schematic diagram of process for treating a gold copper-bearing material.

In another embodiment, step a) occurs in a first reactor and step b) further comprises the steps of:

e) collecting the first ferrous ion species from the first reactor to a second reactor, f) delivering the first ferrous ion species to a second reactor for exposure to the oxidation mixture; and g) collecting the second ferric ion species from the second reactor; and h) delivering the second ferric ion species to the first reactor One embodiment of the present invention is shown in FIG. 1, wherein a concentrate containing the base metal copper is subjected to a leaching process in the presence of a ferric ion species in a reactor shown at 10. An oxidation mixture of $SO_2$ and $O_2$ gas is fed to the reactor to convert the ferrous ion species therein to a ferric ion species. The reactor may for example be a stirred reactor or others such as a vat. With the conditions selected as required, the copper is then leached from the material by way of the reaction shown in either formulae (1) (2) or (3) for example if the copper bearing materials are Chalcopyrite, Covellite or Chalcocite as discussed herein above. The solution is then passed to a separation station 12 wherein the solid leach residue is then separated from the liquid phase bearing both the copper and ferrous species. The liquid phase is then passed through a copper extraction station shown at 14 wherein the copper ion species is first concentrated in a purified solution using solvent extraction and then liberated from the solution, such as by electro-wining procedures. Finally, the remaining liquid phase bearing the ferrous ion species is returned to the reactor 10. However, in this case, the ferrous ion species is reacted with the oxidation mixture of $SO_2$ and $O_2$ gas, which oxidizes the ferrous ion species to a ferric ion species so that it can be reacted with new copper-bearing materials as above described.

Alternatively, the oxidation mixture need not be present in the first reactor, but rather may be present in an oxidation reactor shown at 16, in which case the liquid phase leaving the extraction station 14 and bearing the ferrous ion species is directed through the oxidation station 16 prior to be returned to the reactor 10.

Thus, the present process makes use of an oxidation mixture of $SO_2$ and oxygen to oxidize a ferrous ion species to its ferric form. The present process is useful in the treating of copper-bearing materials and other base metal-bearing materials as described above, either as a step to obtain refined copper as a mineral of economic value, or as a step to remove copper as a nuisance metal, as done for example in precious metals refining. In both cases, the use of the oxidation mixture of $SO_2$ and oxygen provides an oxidizing process which is believed to be more efficient than conventional oxygen leaching processes, thereby allowing the present process to be used in real time, if desired, in the copper reaction.

Figure 2:
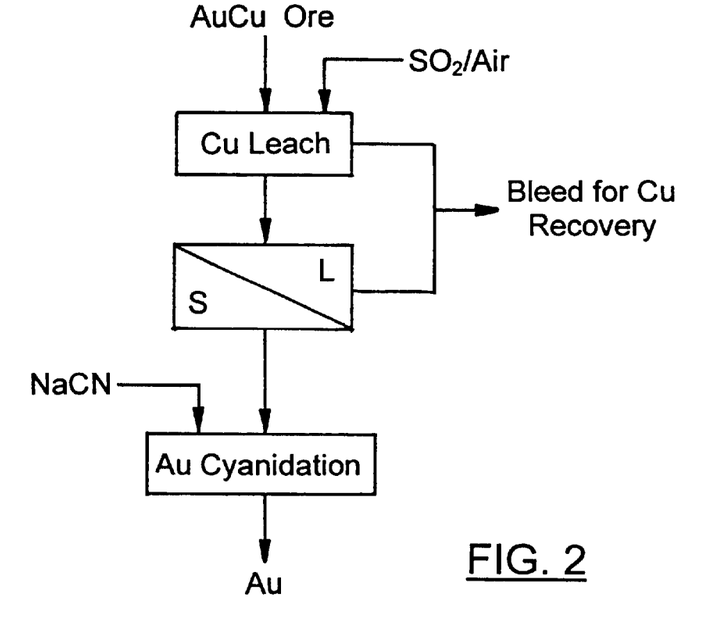
FIG. 2 is a schematic diagram of another process for treating a gold copper-bearing material.
Figure 3:
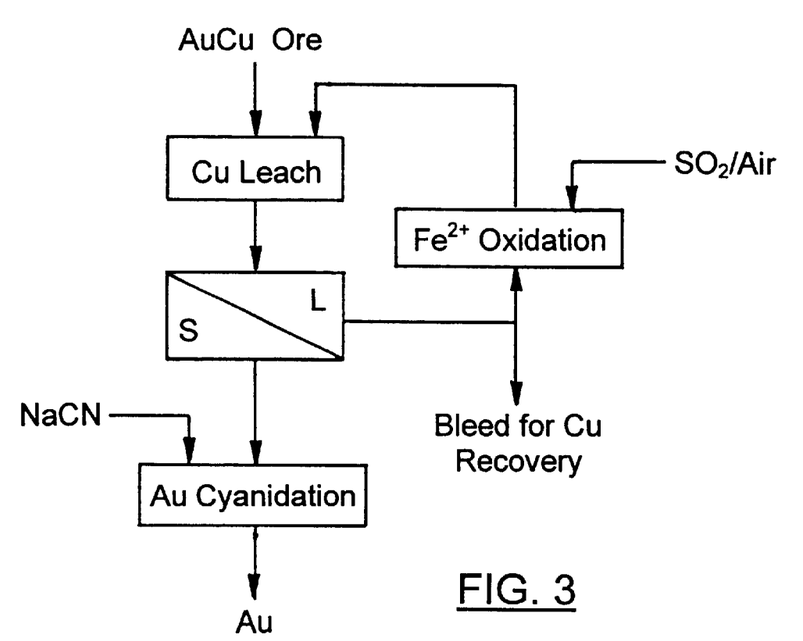
FIG. 3 is a schematic diagram of still another process for treating a copper-bearing material.

For example, in the case of recovering gold from ore materials containing gold as well as significant quantities of copper, cyanide-consuming copper minerals may be removed from the material by way of a ferric sulphate leach solution. The leaching efficiency depends, among other factors, on the concentration of ferric ions in the leach solution. During the copper leaching reaction, the ferric ion is consumed by being reduced to ferrous ion. Conveniently, the present procedure may minimize the costs of the ferric sulphate, since it can be re-oxidized so that it can be used several times This re-oxidation step can be carried out in one step, that as at the same time as the ferric ion is consumed, as generally shown in FIG. 2. Alternatively, the re-oxidation step can be accomplished after all the copper minerals have been dissolved and all the ferric ions have been consumed, in a two-step process, as generally shown in FIG. 3.

While the discussion herein above has been directed more particularly at the extraction of copper from copper-bearing materials with the use of ferric which has been oxidized using an $SO_2/O_2$ gas mixture, it will be understood that the benefits of oxidizing the ferrous ion in this manner can be applied to other base metal mineral extractions, such as nickel, cobalt and zinc, as described above.

In addition, it is believed that the present process may be applied to heap leaching processes wherein, for example, $SO_2$/Air mixtures can be injected into the leach, for example, by blowing the oxidation mixture through pipes buried in the heap, to regenerate ferric in-situ.

Embodiments of the present invention will be described with reference to the following examples which are presented for illustrative purposes only and are not intended to limit the scope of the invention

EXAMPLE 1

Agitation Leach of Copper Concentrates

A low grade copper concentrate containing 16% Cu was treated by the present process, wherein the major copper mineral in this concentrate was Chalcocite, the gangue being mostly Pyrite. Because of mineralogical constraints, the concentrate could not be upgraded further by flotation.

The concentrate was treated with solutions containing various levels of ferric sulphate. Results are presented in Table 1. In tests 1 and 2, the ferric sulphate was not regenerated during the leach. In test 3, the ferric sulphate was regenerated using an $SO_2/O_2$ gas mixture.

Test 1 confirmed the feasibility of ferric sulphate to dissolve Chalcocite provided the ratio of ferric in solution to % copper in solution "FeCu" is equal to or greater than 2.5. In this case, 90.9% of the copper was dissolved in 180 minutes. If the ratio Fe/Cu was reduced below that value, for example to 0.6 as in test 2, the ferric was depleted and the reaction stopped at 56.3% Cu extraction. Test 3 indicated that the addition of $SO_2/O_2$ mixtures during the leach under otherwise similar conditions to test 2 improved copper extraction from 56.3% to 90.2% in 180 minutes.

EXAMPLE 2

Agitation Leach of Copper Concentrates

Another sample of the Chalcocite concentrate of Example 1 was leached according to the conditions of test 3. After the leach was completed, the leach residue was filtered off and discarded. The resulting leach solution containing the copper was treated with a commercial solvent extractant for copper (in this case HENKEL, LIX 984). The barren solution containing the residual iron was re-oxidized using $SO_2/O_2$ mixtures and contacted in a second cycle with a fresh batch of Chalcocite concentrate with similar leach conditions as in the first cycle. This procedure was repeated for four cycles.

Figure 4A:
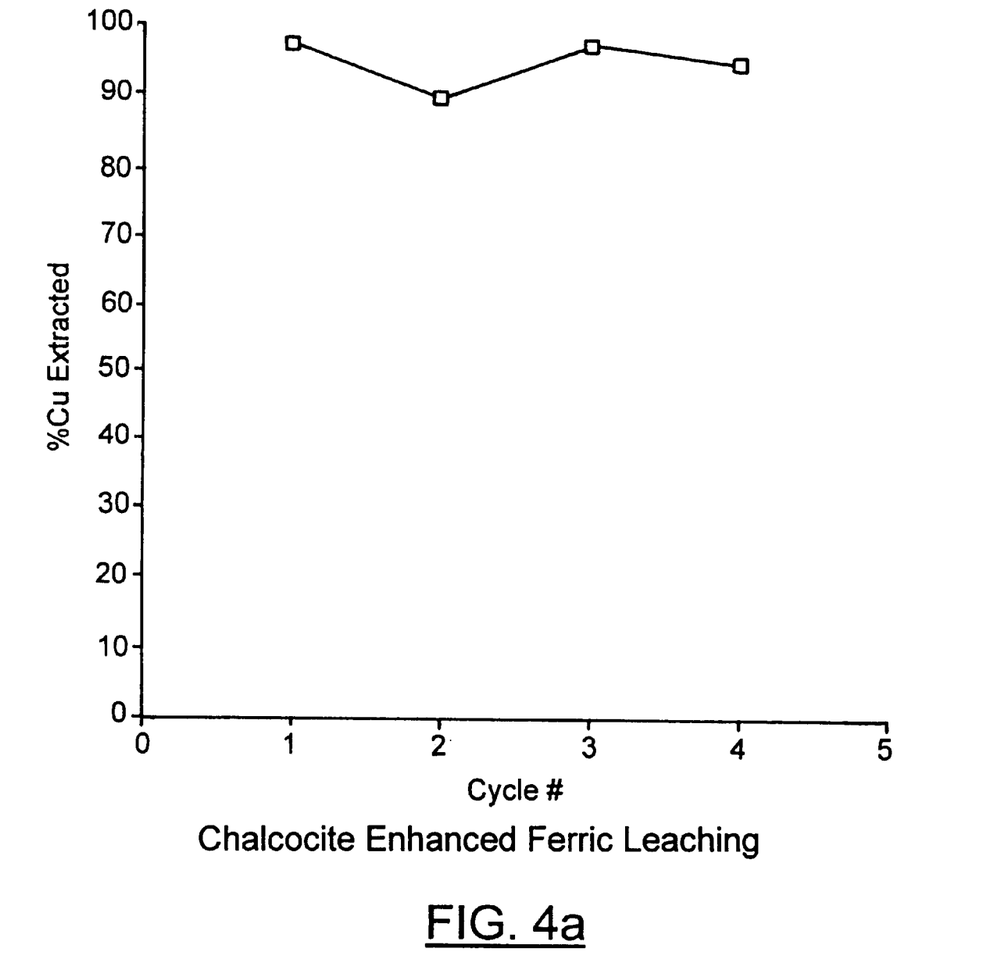
FIGS. 4a and 4b are graphs of results from leaching experiments.
Figure 4B:
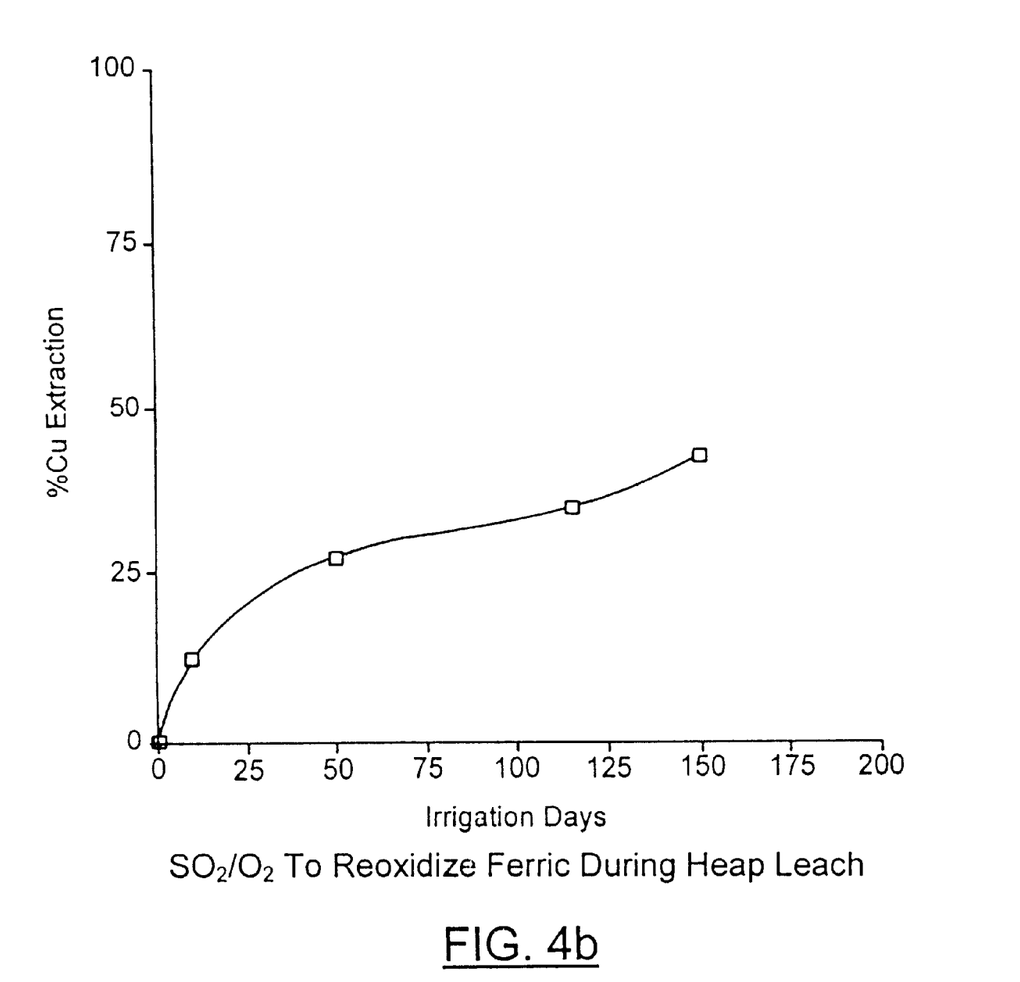

The results of the four cycles are presented in FIG. 4, while the last two cycles are presented in more detail in Table 2. It can be seen that 97.1% and 94.8% of copper was recovered from a sample having a copper content of 16% .

EXAMPLE 3

Cyanide Consuming Au—Cu Ores

This procedure was carried out to test the efficacy of the present process to remove copper contaminants from a gold-bearing ore material. In this case, the sample was a gold concentrate, assaying 12.2 g/t Au which also contained 0.49% copper.

The copper in the sample was of the form that was cyanide soluble (that is in the form of Covellite or Chalcocite). This means that, using conventional procedures, cyanidation of the Au—Cu material would recover the gold but at the expense of high cyanide consumption by the resident copper, making the process uneconomic. In this case, the sample was first reacted with a ferric ion species to remove the resident copper. The results of the procedure are illustrated in Table 3 and show that;

a) Straight cyanidation of the gold ore, without prior removal of the cyanide-consuming copper minerals (Test #4), recovered 77% of the gold but with high cyanide consumption (10.4 kg NaCN/t of ore), which impacts heavily on the economics of the precess and its environmental impact.

b) By leaching cyanide consuming copper minerals with 3.7 g/L ferric ion (added as ferric sulphate) as in Test #5, 72% of the copper was removed which led to a better utilization of cyanide during the subsequent gold cyanidation; gold extraction improved from 77% to 82% while cyanide consumption decreased from 10.4 to 5.4 kg NaCNltonne of ore.

c) By in-situ regeneration of ferric ions during copper leaching (as shown in Test #6) using the object of this invention (98% $O_2$, 2% $SO_2$), copper extraction was further improved from 72% to 81% , with a subsequent further lower cyanide consumption (down from 5.4 to 3.8 kg NaCN/t) and similar gold extractions (81% versus 82% )

The results from regenerating the ferric ion after the copper leach (two-step process) are shown in Table 4. Using $SO_2/O_2$ mixtures (98% $O_2$, 2% $O_2$) ferric ion is fully regenerated in 58 minutes starting from 3.78 g/L ferrous ion, or in 169 minutes starting from 11.56 S/L ferrous ion.

EXAMPLE 4

Copper Heap Leach

Figure 5:
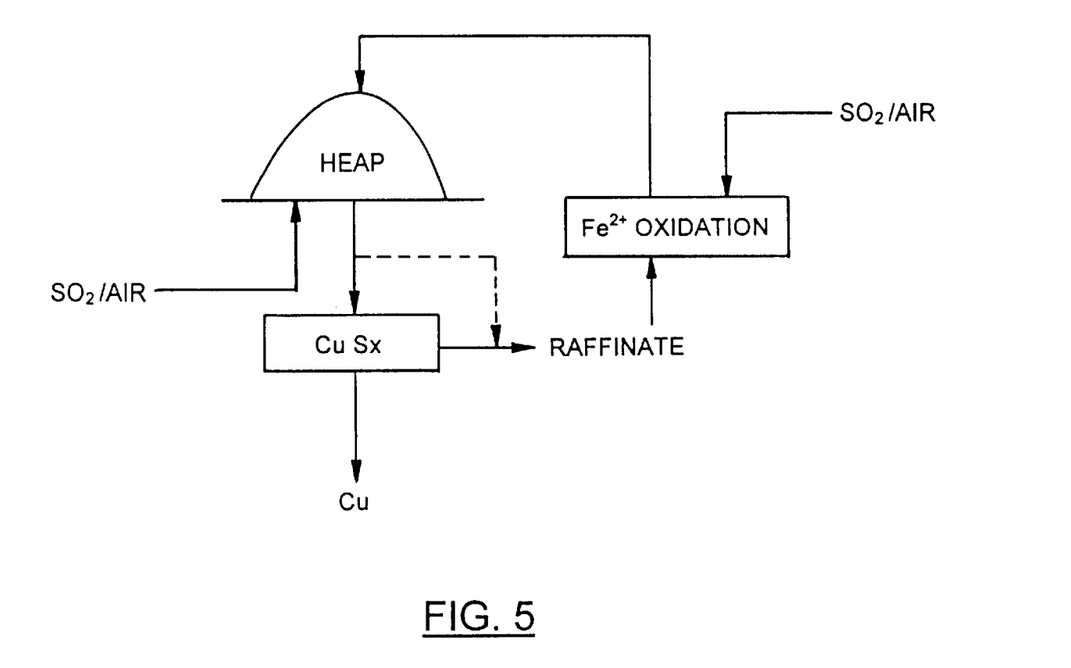
FIG. 5 is a schematic diagram of yet another process for treating a copper-bearing material.

A sample of copper ore, containing 0.45% Cu mostly as Chalcocite CuS was crushed to 100% minus 1 inch and located in an 8 inch diameter, 8 foot high plastic column, to simulate a heap leach operation. The procedure is shown in FIG. 5.

The column heap leach test was irrigated using about 10 g/L $Fe^{3+}$, all other conditions being standard for such tests (irrigation rates, acidity). The solution exiting the column was treated in an agitated vessel and sparged at 40 degrees Celsius using a 98% $O_2$, 2% $SO_2$ gas mixture to regenerate the ferric in 80–90 minutes, and the regenerated solution was re-circulated at the top of the column. When the copper constituent in solution reached a certain level (i.e. 2 g/L Cu), the solution exiting the column was treated by solvent extraction (using commercial organics) to recover the copper, prior to berg sent to the regeneration step.

Desirably, the regeneration of the ferric ion was found not to be as sensitive to temperature and acidity than a comparative conventional bacterial oxidation of ferrous ion. The present process may, in some cases, also be much faster than the conventional bacterial processes, since it has the capacity to generate 5.3 g/L $Fe^{3+}$/hr, even at 40 degrees Celsius.

Table 5 shows results of regeneration tests conducted using $O_2$ alone or with $SO_2$, and the effect of temperature. These results indicate that the addition of only 2% (by volume) of $SO_2$ with the oxygen increases the oxidation rate of ferrous ion to ferric ion species from 0.95 g/L to 4.4 g/L per hour of reaction, and that oxidation rates can still be improved to 8.4 g/L by optimizing other parameters, such as temperature, as test 9 indicates. The use of oxygen alone (test #8) produced a ferric generation rate of less than 1 g/L per hour.

EXAMPLE 5

Application to Chalcopyrite Ores and Concentrates

Figure 6:
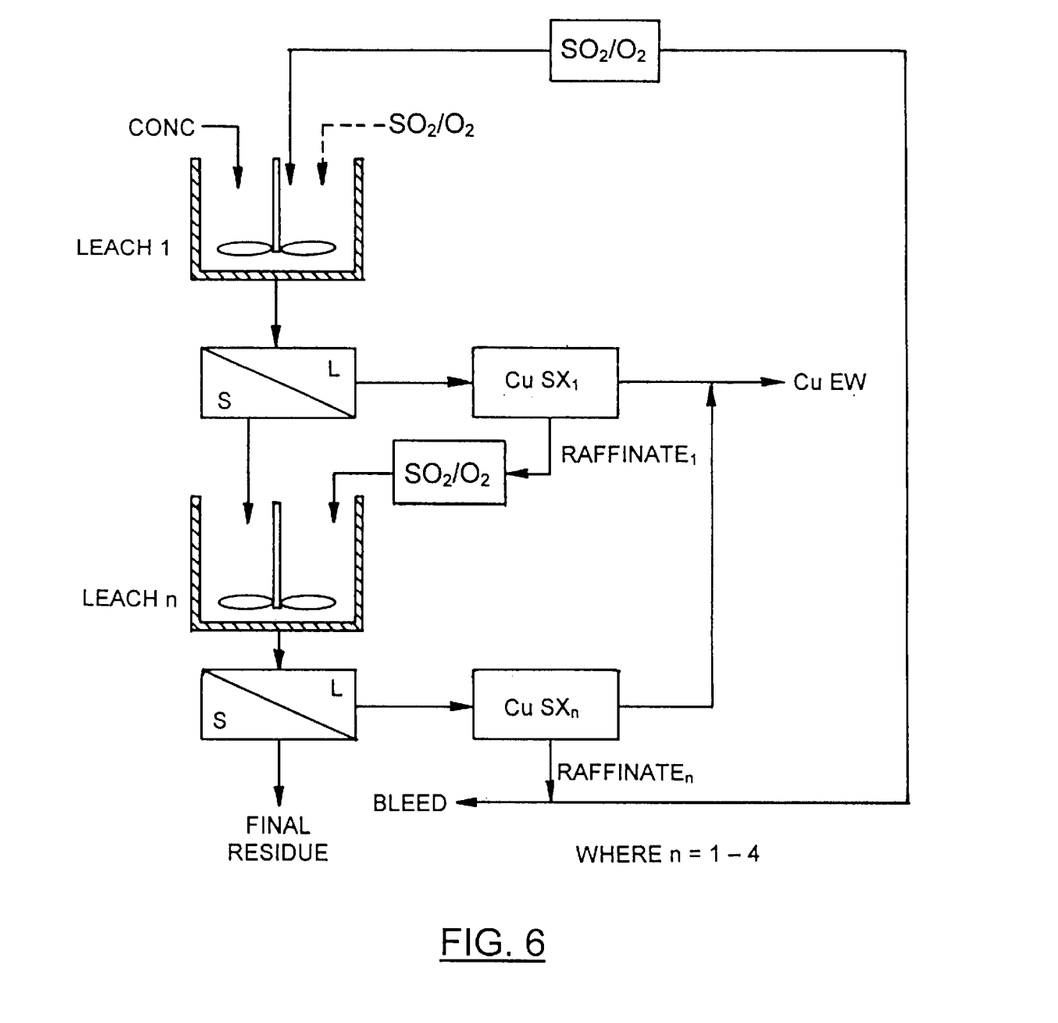
FIG. 6 is a schematic diagram of yet another process for treating a copper-bearing material.

Referring to FIG. 6, a chalcopyrite concentrate from a mine in Manitoba, CANADA, assaying 26.9% Cu, 22.4% Fe, was mixed with a solution of ferric sulphate in a proportion of 100 g concentrate and a liter of ferric sulphate (9% solids) prepared at 76 g/L $Fe^{3+}$. The concentrate was leached at 90 degrees Celsius for 8 hours, while the pH was maintained around 1 with $H_2SO_4$ addition. After filtration and washing, the intermediate residue was assayed 15.8% Cu and 24.1% Fe. (This reside would be sent to stage 2 leaching in a plant operation, that is to repeat the oxidation process). The leach solution assaying 6.1 g/L Cu and 54.2 g/L Fe, contained 46.5% of the copper in the original feed.

The leach solution was then contacted (after pH adjustment) with a standard copper extractant (LIX 984 15% v/v in ISOPAR M), and after 3 repeated contacts, 99.6% of the copper and only 1.7% of the iron were extracted.

The aqueous raffinate, containing 53.5 g/L Fe and less than 1 mg/L Cu was re-oxidized at 50 degrees Celsius using a gas mixture of 98% oxygen and 2% $SO_2$. However, the ferrous can Hi alternatively, if desired, be re-oxidized during the first leach step by adding a gas mixture of oxygen and $SO_2$ therein, for example using the proportions described above, as shown by the dashed lines in FIG. 6. The ferrous was reoxidized to ferric at an average rate of 6.7 g/L iron per hour of reaction. This re-oxidized solution would then be reused to leach the residue from the first stage leach residue to recover more copper. when the initial leach was conducted at 7.5% solids, 60% of the copper was recovered in 8 hours during stage 1 leach. The sequence leach solid/liquid separation/Cu SX can be repeated until the final leach residue is depleted of copper.

TABLE 1

$SO_2/O_2$ mixtures to improve the ferric leaching of a chalcocite concentrate

| | Test No. | | |
|---|---|---|---|
| | Test 1 | Test 2 | Test 3 |
| Conditions | | | |
| $Fe^{3+}$ (initial) | 40 | 10 | 10 |
| $SO_2/O_2$ (mL/min) | 0/0 | 0/0 | 50/2500 |
| Temperature (° C.) | 80 | 80 | 80 |
| Duration (Min) | 180 | 180 | 180 |
| % Solids | | | |
| Results | | | |
| % Cu Extracted | 90.9 | 56.3 | 90.2 |
| % Cu in Residue | 2.03 | 9.79 | 2.30 |

TABLE 2

One step leaching of chalcocite concentrate

|  | Cycle # | |
|---|---|---|
|  | 3 | 4 |
| % Cu Feed | 16 | 16 |
| % Cu Residue | 0.69 | 1.26 |
| g/L $Fe^{3+}$ Feed | 10 | 10 |
| % Cu Recovery | 97.1 | 94.8 |
| Temperature (° C.) | 70 | 70 |
| Retention Time (hours) | 6 | 6 |

TABLE 3

Results of reacting samples with a ferric ion species to remove the resident copper

|  | Test # | | |
|---|---|---|---|
| Process | 4 | 5 | 6 |
| Cu leach | | | |
| $Fe^{3+}$ (g/L) | 0 | 3.7 | 3.9 |
| $O_2$ (%) | 0 | 0 | 98 |
| $SO_2$ (%) | 0 | 0 | 2 |
| % Cu leached | 0 | 72 | 81 |
| % Cu residue | 0.43 | 0.14 | 0.09 |
| Au cyanidation | | | |
| NaCN consumed (kg/t) | 10.4 | 5.4 | 3.8 |
| % Au extracted | 77 | 82 | 81 |
| g/t Au residue | 2.8 | 2.2 | 2.4 |
| Feed | | | |
| % Cu | 0.43 | 0.43 | 0.43 |
| g/t Au | 11.6 | 11.6 | 11.6 |

TABLE 4

Regeneration of ferric ion for the two-step process
Temp = 60° C., $O_2$ = 98%, $SO_2$ = 2%

| Time (Min) | $Fe^{2+}$ (g/L) | Time (Min) | $Fe^{2+}$ (g/L) |
|---|---|---|---|
| 0 | 3.78 | 0 | 11.56 |
| 1 | 3.56 | 5 | 11.33 |
| 4.5 | 3.33 | 20 | 10.22 |
| 10.5 | 2.89 | 40 | 8.78 |
| 22 | 2.00 | 77 | 6.11 |
| 35 | 1.22 | 112 | 3.61 |
| 42 | 0.89 | 135 | 2.11 |
| 47 | 0.44 | 150 | 1.22 |
| 53 | 0.11 | 165 | 0.11 |
| 58 | 0.06 | 169 | 0.06 |

TABLE 5

Ferric regeneration during copper heap leach, results

|  | Test # | | |
|---|---|---|---|
| Parameter | 7 | 8 | 9 |
| Temperature | 65 | 65 | 40 |
| % $O_2$ | 98 | 100 | 98 |
| % $SO_2$ | 2 | 0 | 2 |
| Time (min) | | g/L $Fe^{2+}$ | |
| 0 | 8.8 | 8.8 | 8.8 |
| 20 | 7.7 | 7.7 | 7.5 |

TABLE 5-continued

Ferric regeneration during copper heap leach, results

|  | Test # | | |
|---|---|---|---|
| Parameter | 7 | 8 | 9 |
| 40 | 6.0 | 7.3 | 3.0 |
| 60 | 4.0 | 7.0 | 0.4 |
| 80 | 3.0 | 6.9 | — |
| 100 | 1.8 | 6.8 | — |
| 120 | 0.01 | 6.9 | — |
| g/L $Fe^{3+}$/Hr Average | 4.4 | 0.95 | 8.4 |

What is claimed is:

1. A process of treating a base metal sulphide wherein the base metal is selected from cobalt, copper, nickel and zinc, comprising the steps of:
   a) exposing said base metal sulphide to a leach solution including a first ferric ion species therein, at conditions sufficient to liberate at least a portion of said base metal, thereby causing said first ferric ion species to be reduced to a first ferrous ion species;
   b) reacting said first ferrous ion species with an aqueous oxidation mixture of non-gaseous $SO_2$ and oxygen, at conditions sufficient to oxidize said first ferrous ion species to a second ferric ion species;
   c) exposing said base metal sulphide to said leach solution including said second ferric ion species at conditions sufficient to liberate a base metal ion, thereby causing said second ferric ion species to be reduced to a second ferrous ion species; and
   d) repeating step b) for said second ferrous ion species.

2. A process as defined in claim 1, wherein steps a) to d) occur concurrently in an agitation reactor.

3. A process as defined in claim 1, wherein step a) occurs in a first reactor and step b) further comprises the steps of
   e) collecting said first ferrous ion species from said first reactor to a second reactor,
   f) delivering said first ferrous ion species to a second reactor for exposure to said oxidation mixture; and
   g) collecting said second ferric ion species from said second reactor; and
   h) delivering said second ferric ion species to said first reactor.

4. A process as defined in claim 1, wherein the base metal sulphide is in a heap and wherein steps (a) and (c) include the step of directing said oxidation mixture through said heap.

5. A process as defined in claim 4 wherein the step of directing includes the step of blowing said mixture through pipes located in said heap.

6. A process as defined in claim 1, wherein steps (a) and (c) include the step of mixing a metabisulphite therewith.

7. A process as defined in claim 1, wherein the mixture is aqueous and steps (a) and (c) include the step of establishing $SO_2$ in the mixture by mixing $H_2SO_3$ therewith.

8. A process as defined in claim 1 wherein the steps (a) and (b) occur concurrently and steps (c) and (d) occur concurrently.

9. A process as defined in claim 1, wherein steps (b) and (d) include the step of mixing a metabisulphite therewith.

10. A process as defined in claim 1, wherein steps a) to d) occur concurrently in an agitation reactor.

11. A process for recovering a base metal from a heap of base metal sulphide ore materials, the base metal being selected from cobalt, copper, nickel and zinc, the process comprising the steps of:

forming a regenerative leach circuit containing a leach solution with a ferric ion species, for distributing the leach solution throughout said heap in order to react said material with the ferric ion species in the leach solution, at conditions sufficient to cause at least a portion of said base metal to be oxidized by said ferric ion species, thereby causing said ferric ion species to be converted to a ferrous ion species, wherein said leach solution also contains an oxidation mixture of $SO_2$ and oxygen in order to oxidize said ferrous ion species to form said ferric ion species for subsequent reaction with said material.

12. A process for recovering a base metal from a heap of base metalsulphide ore, the base metal being selected from cobalt, copper, nickel and zinc, the process comprising:

preparing a regenerative leach circuit to carry a leach solution containing a ferric ion species;

distributing the leach solution throughout said heap in order to react said material with the ferric ion species in the leach solution, at conditions sufficient to cause at least a portion of said base metal to be oxidized by said ferric ion species, thereby causing said ferric ion species to be converted to a ferrous ion species, and oxidizing said ferrous ion species with an oxidation mixture of $SO_2$ and oxygen to form said ferric ion species for subsequent reaction with said material.

13. A process as defined in claim 12 wherein the leach solution has a pH of 0.5 to 1.5.

14. A process as defined in claim 12 wherein the pH of the leach solution is 0.5 to 2.5.

15. A process as defined in claim 12 wherein the pH of the leach solution is 0.5 to 2.0.

16. A process for recovering a base metal from a processed base metal sulphide ore material, the base metal being selected from cobalt, copper, nickel and zinc, the process comprising providing a regenerative leach circuit, distributing a leach solution through the regenerative leach circuit which contains a ferric ion species throughout said material in order to react said base metal sulphide ore material with said ferric ion species, at conditions sufficient to cause at least a portion of said base metal to be oxidized by said ferric ion species, thereby causing said ferric ion species to be converted to a ferrous ion species, wherein said leach solution also contains an oxidation mixture of oxygen and a metabisulphite as source for $SO_2$, in order to oxidize said ferrous ion species to form said ferric ion species for subsequent reaction with said base metal sulphide ore material and wherein the leach solution is substantially the entire source of the ferric ion species.

17. A process installation for recovering base metal selected from cobalt, copper, nickel or zinc from a base metal sulphide, the process comprising:

preparing a leach solution regeneration circuit which includes a quantity of ferric ion species;

providing a volume of the sulphide;

directing the regeneration circuit through the volume of sulphide to expose the sulphide to the leach solution including the quantity of ferric ion species under conditions sufficient to cause at least a portion of the said base metal to be oxidized by said ferric ion species, thereby causing said ferric ion species to be converted to a ferrous ion species, oxidizing said ferrous ion species while in the regeneration circuit with an oxidation mixture of $SO_2$ and oxygen to form said ferric ion species for subsequent reaction with said material in the regeneration circuit, wherein the regeneration circuit provides substantially the entire source of the ferric ion species.

18. A process as defied in claim 17 wherein the sulphide is $CuFeS_2$, $Cu_2S$, or $CuS$.

19. A process as defined in claim 17 wherein the leach solution has a pH of 0.5 to 1.5.

20. A process as defined in claim 19 wherein the pH of the leach solution is 0.5 to 2.5.

21. A process as defined in claim 19 wherein the pH of the leach solution is 0.5 to 2.0.

* * * * *